(No Model.)
M. ASH.
WHEEL CLEANER FOR VEHICLES.
No. 601,623. Patented Apr. 5, 1898.
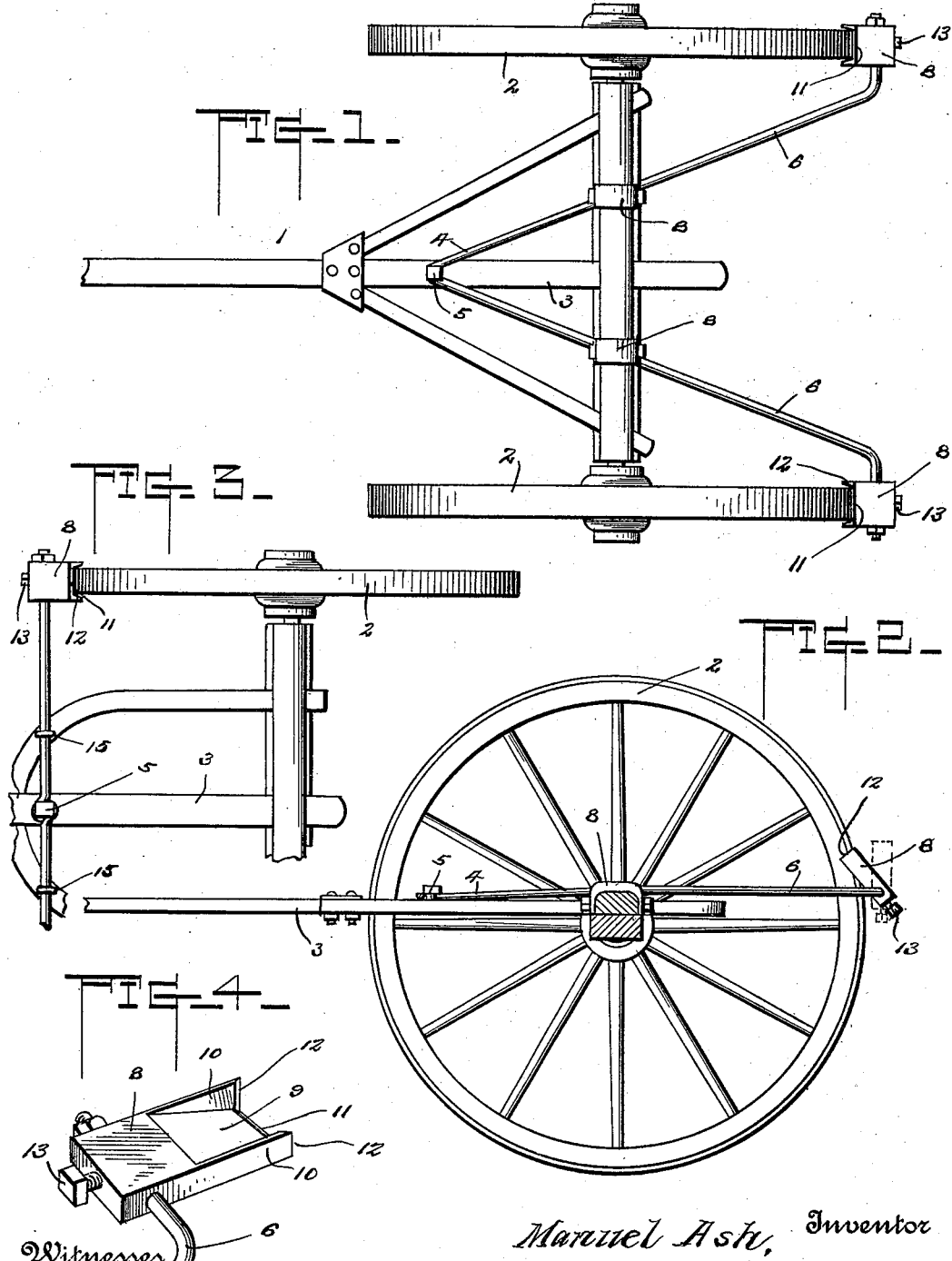
Witnesses
A. M. Paxton
J. A. Wilson
Manuel Ash, Inventor
by H. B. Wilson
Attorney

UNITED STATES PATENT OFFICE.

MANUEL ASH, OF FOREST CITY, SOUTH DAKOTA.

WHEEL-CLEANER FOR VEHICLES.

SPECIFICATION forming part of Letters Patent No. 601,623, dated April 5, 1898.

Application filed June 3, 1897. Serial No. 639,318. (No model.)

*To all whom it may concern:*

Be it known that I, MANUEL ASH, a citizen of the United States, residing at Forest City, in the county of Potter and State of South Dakota, have invented certain new and useful Improvements in Wheel-Cleaners for Vehicles; and I do declare the following to be a full, clear, and exact description of the invention, such as will enable others skilled in the art to which it appertains to make and use the same.

My invention relates to improvements in wheel-cleaners for vehicles; and the object is to provide a simple, effective, and durable device for automatically removing mud and dirt from a vehicle-wheel while in motion.

To these ends the novelty consists in the construction, combination, and arrangement of the same, as will be hereinafter more fully described, and particularly pointed out in the claim.

In the accompanying drawings the same reference characters indicate the same parts of the invention.

Figure 1 is a top plan view of a wheel-cleaner embodying my invention as applied to a vehicle. Fig. 2 is a sectional elevation. Fig. 3 is a top plan view showing the cleaner-shoe in position in front of the wheel, and Fig. 4 is a perspective view of the cleaner-shoe.

1 represents the running-gear of an ordinary vehicle, and 2 2 the wheels.

3 represents the rear end of the reach, to which is secured a V-shaped bracket 4 by means of a bolt 5. Rearwardly-diverging arms 6 6 of this bracket are adjustably secured through the rear axle 7 by means of the adjustable clamps 8 8. The free ends of the arms 6 6 extend outwardly and horizontally across and behind the rear wheels A cast-metal shoe or "cleaner" 8 is adjustably secured on the horizontal end of each of the arms, so as to project into the path of the wheel. These cleaners 8 are each formed with a diagonal recess 9, having parallel ears 10 10, which project on each side of the tire and felly.

The upper end of the cleaner is provided with a knife or beveled edge 11, and 12 12 represent corresponding bevel knife-edges formed on the upper edge of the cleaners.

The bracket 4 is formed of a spring-rod, so that its diverging arms will tend to hold the cleaners against the wheels, as shown.

13 represents a set-screw adjustably secured in the cleaners, so that the latter may be conveniently adjusted to the wheel to compensate for wear and also to be thrown out of contact therewith when not required for use, as shown in dotted lines in Fig. 2.

In some instances a straight transverse bar, as 14, (shown on the left hand of Fig. 3,) may be employed, which is secured to the hounds by suitable clamps 15 15 and the cleaners adjustably secured to its outer ends, as hereinbefore described.

As shown in Figs. 1 and 2, the shoe acts as a drag to remove the dirt from the wheel, while in Fig. 3 the shoe is placed in front of the wheel and acts as a scraper.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new, and desire to secure by Letters Patent of the United States, is—

The combination with a vehicle running-gear 1 and its wheels 2, 2 of the V-shaped spring-metal bracket 4 fixed to the running-gear by the bolt 5 and adjustable clamps 8, 8 and leaving the free ends of its integral diverging arms 6, 6 extending across the path of the wheels, and the cast-metal shoes 8, 8 adjustably secured on the free ends of said arms, by means of the set-screws 13, 13 and having their faces contiguous to said wheels formed with a diagonal recess 9 and parallel ears 10, 10 terminating in beveled edges 12, 12 substantially as shown and described.

In testimony whereof I hereunto affix my signature in presence of two witnesses.

MANUEL ASH.

Witnesses:
JANE E. WALDRON,
EDWIN P. THORNE.